June 2, 1970     H. M. MARTIN ET AL     3,515,256
CANE HEAPER
Filed Nov. 4, 1968     2 Sheets-Sheet 1
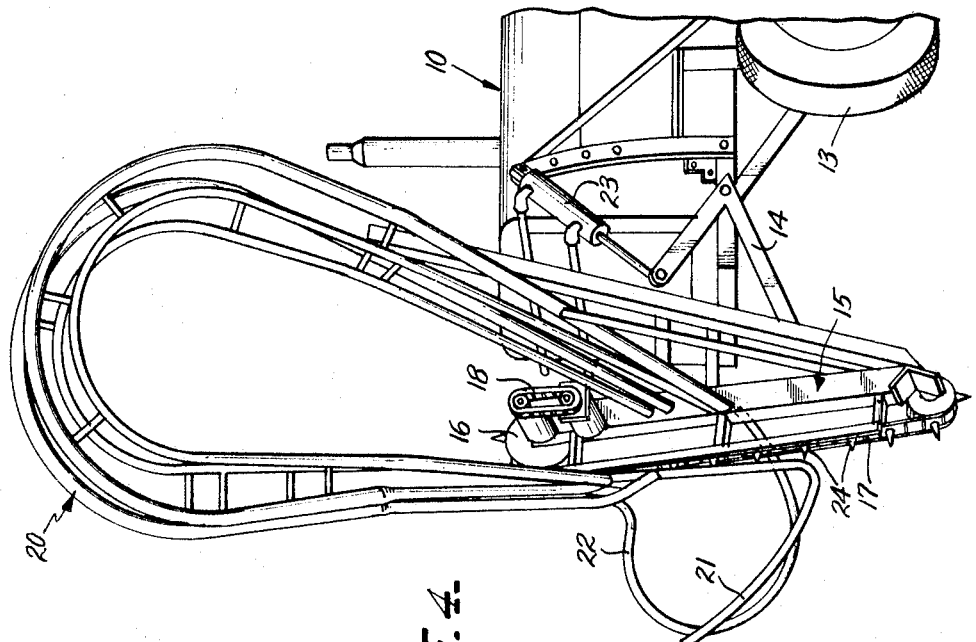
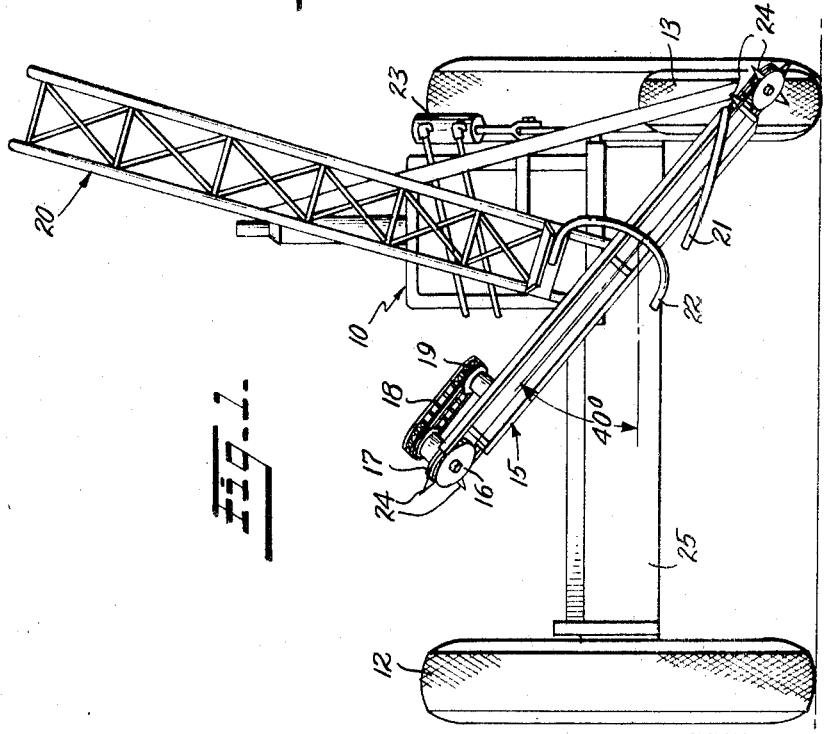
INVENTORS
HARRY M. MARTIN
PAUL J. POCHE
BY
Holcombe, Wetherill & Brisebois
ATTORNEYS

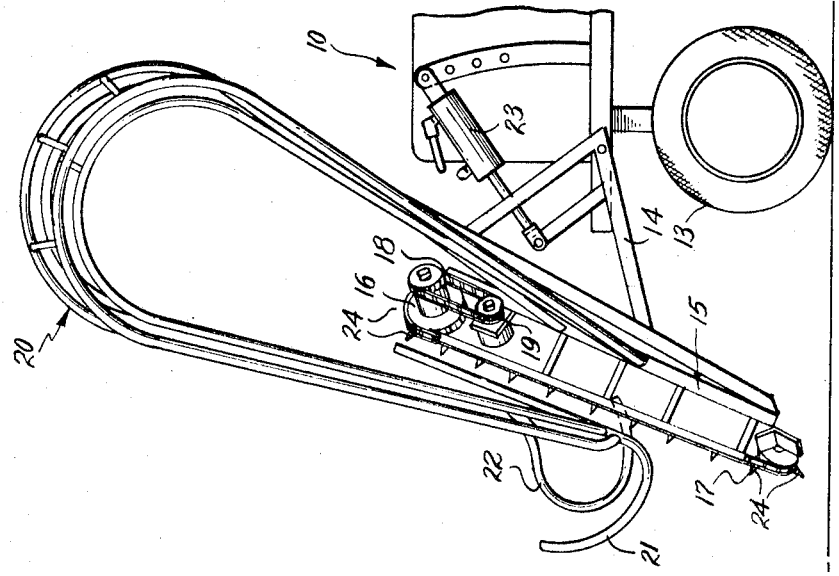
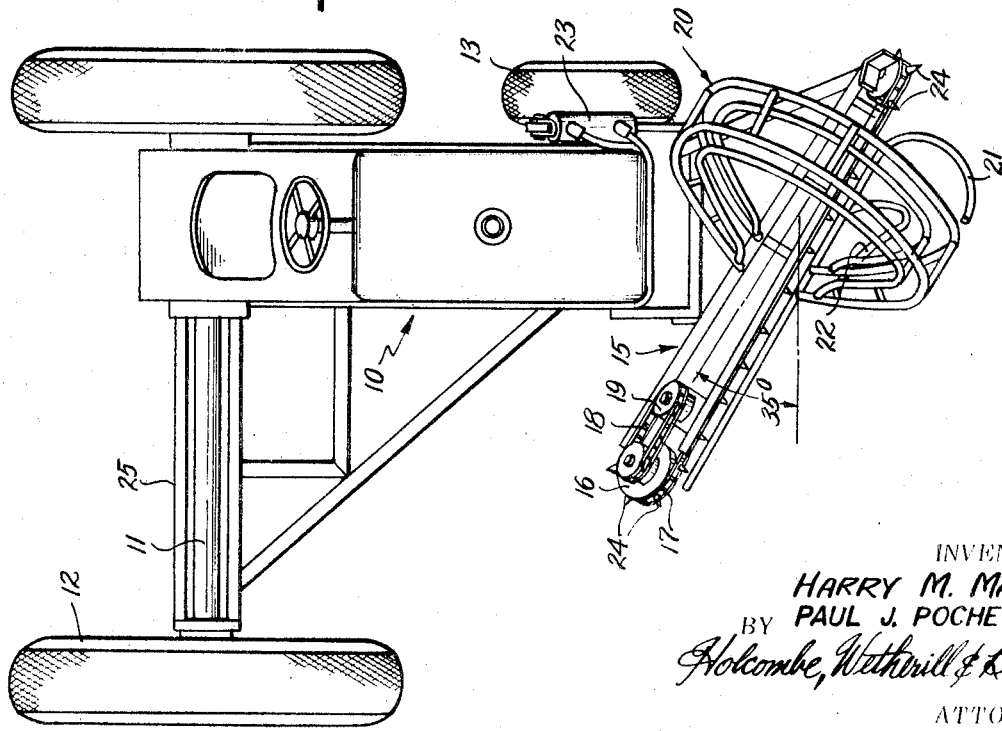

United States Patent Office 3,515,256
Patented June 2, 1970

3,515,256
CANE HEAPER
Harry M. Martin, Paulina, La. 70763, and Paul J.
Poche, Rte. 1, Box 65, Convent, La. 70723
Filed Nov. 4, 1968, Ser. No. 773,254
Int. Cl. B65g 47/24
U.S. Cl. 198—33    7 Claims

ABSTRACT OF THE DISCLOSURE

A tractor-mounted cane heaper comprising an endless tilted pronged chain for lifting the cane, a tripper for restraining one end of the cane while it is being flipped, and a guide for directing the cane during flipping. The tractor has a special wheel arrangement to avoid crushing the cane.

DESCRIPTION OF THE INVENTION

This invention relates to a device for "heaping" sugar cane. In the conventional harvesting of sugar cane the stalks are first cut off near the ground so that they fall in a row which parallels the path of travel of the machine during the cutting. In order to reach a subsequent uncut row the machine has to pass over the ground occupied by a row of cut stalks. Consequently it is necessary to remove the row of cut stalks from the path of the machine. This has customarily been accomplished by moving the cut stalks aside to form a row parallel to the path from which they are being removed. This procedure is known as "heaping," and a machine intended to serve this general purpose is described in U.S. Pat. No. 2,871,645 to La Rose. The La Rose machine consists essentially of an endless chain mounted to travel in an angularly disposed path in front of a harvester and carrying projecting prongs which engage the stalks and swing them about their ends into a parallel path clear of the machine.

Unfortunately, this machine is not overly reliable in its operation because it depends on engagement of a stalk end with the ground to provide the fulcrum for its turning action, and there is no guide to direct the cane as it is being turned. There are also disadvantages inherent in the fact that it is mounted on a harvester.

Our invention is accordingly directed to a cane heaper provided with a tripper to insure flipping of the cane at the desired point, and a guide to direct the cane being flipped. The heaper is mounted on a tractor having a special wheel arrangement to avoid crushing the cane and the invention includes the combination of this special tractor with the heaper as well as the heaper per se.

A preferred embodiment of the invention will now be described with reference to the accompanying drawings, in which:

FIG. 1 is a front view of our new heaper;

FIG. 2 is a top plan view of the heaper, showing it mounted on our special tractor;

FIG. 3 is a side view of the heaper; and

FIG. 4 is a perspective view of the heaper as seen from the front and left.

As shown on these drawings a tractor 10 is provided with an elongated rear axle 11 so that the rear right wheel 12 is spaced well away from the tractor body. The tractor is provided with only a single front wheel 13, at the left of the machine. A special brace 14 is pivotally attached to the front of the tractor and carries an elongated frame 15 which carries at its opposite ends the sprocket wheels 16 on which an endless conveyor chain 17 travels. One of these sprockets is driven by a chain 18 from a drive wheel 19, which is in turn driven from any suitable power source on the tractor.

The frame 15 is surmounted by a horseshoe-shaped support 20, one end of which is attached to the frame, while its other end carries a cane guide or pusher 21 and a tripper 22.

The angle at which the conveyor frame 15 and chain 17 are positioned is rather critical. The center line of the chain's path of travel should be at an angle of 30–35° and preferably 32° with respect to the horizontal, and about 35–45° with respect to a line normal to the path of travel.

The heaper may be raised and lowered by means of the hydraulic cylinder 23 in a conventional manner.

In operation, the sprockets are rotated in a direction which causes the front side of the conveyor to travel upwardly. The cut cane is pressed down by the "pusher" or cane guide 21 and led to the lower end of the conveyor, where it is engaged by the prongs 24 on the conveyor chain and pulled upwardly while still in a horizontal position or a position inclined slightly to the horizontal. The cane then encounters the tripper 22, which prevents the part thereof below the conveyor from continuing upward, while the portion above the conveyor continues to be driven upward by the prongs of the conveyor. This flips the cane over, so that the end which was previously to the left of the machine is to its right, while the cane guide 21 prevents it from falling backward or forward. The conveyor then delivers the cane to the right of the machine, where it falls in a row which would normally be traversed by the wheels of the tractor. For this reason, the right front wheel of the tractor is omitted and the rear wheel is mounted on an elongated axle which permits the rear wheel to pass to the right of the cane. It will of course be appreciated that the tractor must be provided with an extension 25 for supporting the elongated axle. The conveyor must begin far enough to the left of the tractor to pick up cut cane immediately adjacent a row of standing cane at its left, without having the left wheel encounter the standing cane, and if it were also to extend far enough to the right to eject cane to a position clearing a normal right wheel the conveyor would be unduly long, expensive, cumbersome, and encounter flipping problems since the distance of flipping is related to the length of the cane.

What is claimed is:

1. A cane heaper comprising an endless flexible conveyor member carrying a plurality of spaced prongs, means for mounting said conveyor on a vehicle at an angle to a horizontal plane and to a plane normal to the direction of travel of the vehicle, means for guiding cane into contact with the lower end of said conveyor as said vehicle is advanced along a row of cut cane so that a portion of each cane is below and a portion above the conveyor, means for driving said tilted conveyor in a direction causing it to lift said guided cane, and tripping means below said conveyor for arresting at a predetermined point the progress of that portion of said lifted cane which extends below said conveyor, while the remainder of said cane continues to be lifted until said cane is flipped over for delivery in a reversed position at the upper end of said conveyor.

2. A cane heaper as claimed in claim 1 comprising a U-shaped guide support extending over said conveyor transversely of its path of travel.

3. A cane heaper as claimed in claim 2 in which said one end of said U-shaped guide support is supported on the conveyor mounting means, and the other end of said U-shaped guide support carries said cane guide and tripper.

4. A cane heaper as claimed in claim 1 in which said conveyor is positioned at an angle of 30–35° with respect to the horizontal, and at 35–45° with respect to a plane normal to the direction of travel.

5. A cane heaper as claimed in claim 4 in which said conveyor is positioned at an angle of about 32° with respect to the horizontal.

6. In combination, a cane heaper as claimed in claim 1 and a vehicle on which said cane heaper is mounted by said mounting means, said vehicle having a single front wheel and rear axle which extends enough further to one side of said vehicle than does said conveyor for a wheel mounted on said rear axle to clear cane heaped by said conveyor at said one side.

7. The combination claimed in claim 6 in which the higher end of said conveyor is at said one side of said vehicle and said single front wheel is on the opposite side of said vehicle.

References Cited
UNITED STATES PATENTS

| | | | |
|---|---|---|---|
| 2,799,984 | 7/1957 | La Rose et al. | 56—1 X |
| 2,871,645 | 2/1959 | La Rose et al. | 56—376 |

GERALD M. FORLENZA, Primary Examiner

R. J. SPAR, Assistant Examiner

U.S. Cl. X.R.

56—17, 119, 376; 198—13; 214—1, 5